United States Patent
Zenitani et al.

(10) Patent No.: US 11,866,340 B2
(45) Date of Patent: Jan. 9, 2024

(54) SILICA PARTICLE AND METHOD FOR PRODUCING THE SAME

(71) Applicant: FUJIFILM BUSINESS INNOVATION CORP., Tokyo (JP)

(72) Inventors: Yuka Zenitani, Minamiashigara (JP); Koji Sasaki, Minamiashigara (JP); Sakae Takeuchi, Minamiashigara (JP); Yoshifumi Eri, Minamiashigara (JP); Takahiro Mizuguchi, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 469 days.

(21) Appl. No.: 16/997,541

(22) Filed: Aug. 19, 2020

(65) Prior Publication Data
US 2021/0300771 A1    Sep. 30, 2021

(30) Foreign Application Priority Data

Mar. 24, 2020  (JP) ................................ 2020-053001
Mar. 24, 2020  (JP) ................................ 2020-053002

(51) Int. Cl.
*C01B 33/18* (2006.01)
*C09C 1/30* (2006.01)

(52) U.S. Cl.
CPC ............ *C01B 33/18* (2013.01); *C09C 1/3054* (2013.01); *C09C 1/3081* (2013.01); *C01P 2004/64* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 2002/0055051 A1 | 5/2002 | Kudo et al. | |
| 2014/0106269 A1* | 4/2014 | Tanaka | G03G 5/14708 428/402 |
| 2018/0074425 A1 | 3/2018 | Mizuguchi et al. | |

FOREIGN PATENT DOCUMENTS

| | | | |
|---|---|---|---|
| JP | 2001-194825 A | | 7/2001 |
| JP | 2004143028 A | * | 5/2004 |
| JP | 2011-185998 A | | 9/2011 |
| JP | 2015-000830 A | | 1/2015 |
| JP | 2017-039618 A | | 2/2017 |
| JP | 2018-045233 A | | 3/2018 |

OTHER PUBLICATIONS

Machine translation of Hideharu et al., JP 2017039618A (Year: 2017).*
Machine translation of Eiji et al., JP 2004143028A (Year: 2004).*

* cited by examiner

*Primary Examiner* — Coris Fung
*Assistant Examiner* — Keling Zhang
(74) *Attorney, Agent, or Firm* — Oliff PLC

(57) ABSTRACT

A silica particle includes: a quaternary ammonium salt, in which the following expressions are satisfied, $0.90 \leq F_{BEFORE}/F_{AFTER} \leq 1.10$, and $5 \leq F_{SINTERING}/F_{BEFORE} \leq 20$, in which $F_{BEFORE}$ represents a maximum frequency value of a pore diameter of 2 nm or less in the silica particles before washing, which is obtained from a pore distribution curve in a nitrogen gas adsorption method, $F_{AFTER}$ represents a maximum frequency value of the pore diameter of 2 nm or less in the silica particles after washing, which is obtained from the pore distribution curve in the nitrogen gas adsorption method, and $F_{SINTERING}$ represents a maximum frequency value of the pore diameter of 2 nm or less in the silica particles before washing and after sintering at 600° C., which is obtained from the pore distribution curve in the nitrogen gas adsorption method.

12 Claims, No Drawings

SILICA PARTICLE AND METHOD FOR PRODUCING THE SAME

CROSS-REFERENCE TO RELATED APPLICATIONS

This application is based on and claims priorities under 35 USC 119 from Japanese Patent Application No. 2020-053001 filed on Mar. 24, 2020 and Japanese Patent Application No. 2020-053002 filed on Mar. 24, 2020.

BACKGROUND

Technical Field

The present invention relates to a silica particle and a method for producing the same.

Related Art

Silica particles are used as an additive component or a main component of toners, cosmetics, rubber, abrasives, etc., and play a role of, for example, improving the strength of a resin, improving flowability of powder, and preventing packing. Properties of a silica particle are considered to depend on the shape and surface properties of the silica particle, and a surface treatment on the silica particle and complexing of silica with a metal or metal compound have been proposed.

For example, Patent Literature 1 discloses "a toner containing toner particles which contain a binder resin and a colorant, and an external additive A, and in the external additive A: (i) a charge control agent is contained on the surface thereof; (ii) a wall friction angle θ calculated from equation (1): θ=τ/5.0 is 25.0° or less, where τ represents shear stress obtained when rotating a disc-shaped disc by (π/36) rad at (π/10) rad/min while advancing, with a vertical load of 5.0 kPa, the disc-shaped disc into a powder layer of the external additive A formed by applying a vertical load of 15.0 kPa; (iii) a number average particle diameter (D1) of primary particles is 70 nm or more and 500 nm or less; and (iv) a density represented by "equation (2): density=area of external additive A/area of region surrounded by envelope of external additive A" is 0.40 or more and 0.90 or less".

Patent Literature 2 discloses "a silica powder containing a plurality of silica particles in which a quaternary ammonium salt is introduced into a silica structure having a "Si—O" bond as a repeating unit".

Patent Literature 3 discloses "a spherical silica composition containing a silane coupling agent, a charge control agent, and spherical silica fine powders, and in the spherical silica fine powders, the average particle diameter is 0.090 μm or more and 0.140 μm or less as measured by a laser diffraction scattering type particle diameter distribution measurement device, the content of particles having a particle diameter of 0.150 μm or more is 5.0 mass % or more and 25.0 mass % or less, and the content of particles having a particle diameter of 0.300 μm or more is 1.0 mass % or less".

Patent Literature 4 discloses "an electrostatic image developing toner obtained by mixing toner particles with external charge control particles for controlling a triboelectric charge amount of the toner particles and containing a charge control agent (CCA) deposited on the surface of carrier particles having an average particle diameter of 20 nm to 500 nm, in which the external charge control particles are external charge control particles for controlling the triboelectric charge amount of the electrostatic image developing toner and containing carrier particles, which contains hydrophobic spherical silica fine particles having an average particle diameter of 20 nm to 500 nm obtained by subjecting, to a hydrophobic treatment, the surface of the hydrophilic spherical silica fine particles obtained by a sol-gel method, and a charge control agent deposited on the surface of the carrier particles, the charge control agent (CCA) is contained in the range of $1\times10^{-3}$ to $1\times10^{-1}$ part by mass based on 1 part by mass of the carrier particles, and the external charge control particles are mixed in an amount of 0.001 to 0.05 part by mass based on 1 part by mass of the toner particles".

Patent Literature 5 discloses "an external additive for electrostatically charged image developing toner including spherical hydrophobic fine silica particles having primary particles with a particle diameter of from 0.01 to 5 mum and having been treated with a compound selected from the group consisting of a quaternary ammonium salt compound, a fluoroalkyl-group-containing betaine compound and a silicone oil, in which the fine silica particles fulfill the following conditions (i) and (ii): (i) when an organic compound which has a dielectric constant of from 1 to 40 F/m and fine silica particles are mixed in a weight ratio of 5:1 and shaken, the fine silica particles disperse uniformly in the organic compound; and (ii) the quantity of primary particles remaining as primary particles when methanol is evaporated under heating by means of an evaporator from a dispersion prepared by dispersing the fine silica particles in methanol and thereafter the particles are held at a temperature of 100° C. for 2 hours, represents 20% or more of the quantity of primary particles originally present."

Patent Literature 1: JP-A-2018-045233
Patent Literature 2: JP-A-2017-039618
Patent Literature 3: JP-A-2015-000830
Patent Literature 4: JP-A-2011-185998
Patent Literature 5: JP-A-2001-194825

SUMMARY

Aspects of certain non-limiting embodiments of the present disclosure relate to a silica particle containing a quaternary ammonium salt, which prevent an increase in electrostatic capacitance as compared with

- a case where a ratio $F_{BEFORE}/F_{AFTER}$ of a maximum frequency value $F_{BEFORE}$ of a pore diameter of 2 nm or less in silica particles before washing obtained from a pore distribution curve in a nitrogen gas adsorption method to a maximum frequency value $F_{AFTER}$ of the pore diameter of 2 nm or less in silica particles after washing obtained from the pore distribution curve in the nitrogen gas adsorption method is less than 0.90,
- a case where a ratio $F_{SINTERING}/F_{BEFORE}$ of a maximum frequency value $F_{SINTERING}$ of the pore diameter of 2 nm or less in silica particles before washing and after sintering at 600° C. obtained from the pore distribution curve in the nitrogen gas adsorption method to the maximum frequency value $F_{BEFORE}$ is less than 5, or
- a case where a ratio $C_{AFTER}/C_{BEFORE}$ of an electrostatic capacitance $C_{AFTER}$ of resin particles whose surface is adhered with silica particles separated from a mixture after the mixture is obtained by mixing resin particles, whose surface is adhered with the silica particles before washing, with ferrite powders under specific conditions to an electrostatic capacitance $C_{BEFORE}$ of resin particles whose surface is adhered with the silica particles separated from a mixture after the mixture is obtained by mixing resin particles, whose surface is adhered with the silica particles after washing, with ferrite powders under specific conditions is more than 1.5.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a silica particle including a quaternary ammonium salt, in which the following expressions are satisfied, $0.90 \le F_{BEFORE}/F_{AFTER} \le 1.10$, and $5 \le F_{SINTERING}/F_{BEFORE} \le 20$, in which $F_{BEFORE}$ represents a maximum frequency value of a pore diameter of 2 nm or less in the silica particles before washing, which is obtained from a pore distribution curve in a nitrogen gas adsorption method, $F_{AFTER}$ represents a maximum frequency value of the pore diameter of 2 nm or less in the silica particles after washing, which is obtained from the pore distribution curve in the nitrogen gas adsorption method, and $F_{SINTERING}$ represents a maximum frequency value of the pore diameter of 2 nm or less in the silica particles before washing and after sintering at 600° C., which is obtained from the pore distribution curve in the nitrogen gas adsorption method.

DETAILED DESCRIPTION

Hereinafter, an exemplary embodiment of the present invention will be described. These descriptions and Examples illustrate the exemplary embodiment, and do not limit the scope of the exemplary embodiment.

In the numerical ranges described in stages in this description, an upper limit or a lower limit described in one numerical range may be replaced with an upper limit or a lower limit of the numerical range described in other stages. Further, in the numerical ranges described in the present disclosure, the upper limit or the lower limit of the numerical range may be replaced with values shown in Examples.

In the present description, each component may include a plurality of corresponding substances.

In the present description, in a case of referring to the amount of each component in the composition, when there are a plurality of substances corresponding to each component in the composition, unless otherwise specified, it refers to the total amount of the plurality of substances present in the composition.

«Silica Particle»

A silica particle according to a first exemplary embodiment contains a quaternary ammonium salt, in which a ratio $F_{BEFORE}/FASTER$ of a maximum frequency value $F_{BEFORE}$ of a pore diameter of 2 nm or less in silica particles before washing obtained from a pore distribution curve in a nitrogen gas adsorption method to a maximum frequency value $F_{AFTER}$ of the pore diameter of 2 nm or less in silica particles after washing obtained from the pore distribution curve in the nitrogen gas adsorption method is 0.90 or more and 1.10 or less, and a ratio $F_{SINTERING}/F_{BEFORE}$ of a maximum frequency value $F_{SINTERING}$ of the pore diameter of 2 nm or less in silica particles before washing and after sintering at 600° C. obtained from the pore distribution curve in the nitrogen gas adsorption method to the maximum frequency value $F_{BEFORE}$ is 5 or more and 20 or less.

A silica particle according to a second exemplary embodiment contain a quaternary ammonium salt, in which a ratio $C_{AFTER}/C_{BEFORE}$ of an electrostatic capacitance $C_{AFTER}$ of resin particles whose surface is adhered with silica particles separated from a mixture after the mixture is obtained by mixing resin particles, whose surface is adhered with the silica particles before washing, with ferrite powders under specific conditions to an electrostatic capacitance $C_{BEFORE}$ of resin particles whose surface is adhered with silica particles separated from a mixture after the mixture is obtained by mixing resin particles, whose surface is adhered with the silica particles after washing, with ferrite powders under specific conditions is 1.5 or less.

Hereinafter, the silica particle according to the first exemplary embodiment and the silica particle according to the second exemplary embodiment will be collectively referred to as the silica particle according to the exemplary embodiment.

The silica particle is used in various applications such as fillers and external additives. However, silica particles in the related art tend to have a high electrostatic capacitance on the particle surface. Therefore, there is a tendency that the electrical resistance of a contact material in contact with the silica particles or a mixture in which the silica particles and the contact material are mixed is easily increased. Namely, there is a tendency that static electricity is easily accumulated.

On the other hand, since the silica particle according to the exemplary embodiment has the above-mentioned configuration, an increase in electrostatic capacitance is prevented. Although the reason is not always clear, it may be estimated as follows.

The silica particle according to the exemplary embodiment contains a quaternary ammonium salt. The quaternary ammonium salt has a positive charge. Compared with silica particle containing no quaternary ammonium salt, the silica particle containing the quaternary ammonium salt tends to be difficult to be triboelectrically charged as a whole bulk since the particle surface has a charge having a polarity opposite to that of the silica surface.

Further, in the silica particles according to the first exemplary embodiment, the ratio $F_{BEFORE}/F_{AFTER}$ of the maximum frequency values of the pore diameter of 2 nm or less in the silica particles before and after washing is 0.90 or more and 1.10 or less, and the ratio $F_{SINTERING}/F_{BEFORE}$ of the maximum frequency values of the pore diameter of 2 nm or less in the silica particles before and after sintering is 5 or more and 20 or less, which are obtained from the pore distribution curve in the nitrogen gas adsorption method. That is, the particle before sintering does not have pores since the quaternary ammonium salt is present inside the pores, but when the quaternary ammonium salt is removed by the sintering step, pores are present on the silica surface. Since the quaternary ammonium salt is present inside the pores, there is a tendency that the quaternary ammonium salt contained in the silica particle is difficult to be released from the surface even after washing. As a result, it is considered that the increase in electrostatic capacitance of the silica particle on the particle surface is prevented.

In the silica particle according to the second exemplary embodiment, regarding the separated resin particles whose surface is adhered with the silica particles after mixing resin particles whose surface is adhered with the silica particles and ferrite powders under the above conditions, the ratio $C_{AFTER}/C_{BEFORE}$ of the electrostatic capacitances before and after washing is 1.5 or less. That is, even after bringing the resin particles whose surface is adhered with the silica particles and into contact with the ferrite powders, it is difficult to triboelectrically charge the ferrite powders. Namely, there is a tendency that static electricity is difficult to be accumulated. As a result, it is considered that the increase in electrostatic capacitance of the silica particles on the particle surface is prevented.

[Properties of Silica Particle]

Maximum Frequency Value Obtained from Pore Distribution Curve in Nitrogen Gas Adsorption Method In the silica particle according to the first exemplary embodiment, the ratio $F_{BEFORE}/F_{AFTER}$ of the maximum frequency value $F_{BEFORE}$ of the pore diameter of 2 nm or less in the silica particles before washing obtained from the pore distribution curve in the nitrogen gas adsorption method to the maximum frequency value $F_{AFTER}$ of the pore diameter of 2 nm or less in the silica particles after washing obtained from the pore distribution curve in the nitrogen gas adsorption method is 0.90 or more and 1.10 or less, and, from the viewpoint of preventing the increase in electrostatic capacitance, is preferably 0.97 or more and 1.07 or less, and more preferably 0.95 or more and 1.05 or less.

In the silica particle according to the second exemplary embodiment, the ratio $F_{BEFORE}/F_{AFTER}$ of the maximum frequency value $F_{BEFORE}$ of the pore diameter of 2 nm or less in the silica particles before washing obtained from the pore distribution curve in the nitrogen gas adsorption method to the maximum frequency value $F_{AFTER}$ of the pore diameter of 2 nm or less in the silica particles after washing obtained from the pore distribution curve in the nitrogen gas adsorption method is preferably 0.90 or more and 1.10 or less, more preferably 0.97 or more and 1.07 or less, and still more preferably 0.95 or more and 1.05 or less, from the viewpoint of preventing the increase in electrostatic capacitance.

The specific method for setting the ratio $F_{BEFORE}/F_{AFTER}$ before and after washing within the above range is not particularly limited, and examples thereof include a method of subjecting the silica particle to a surface treatment with a quaternary ammonium salt using a supercritical fluid in the production of the silica particle.

In the silica particle according to the first exemplary embodiment, the ratio $F_{SINTERING}/F_{BEFORE}$ of the maximum frequency value $F_{SINTERING}$ of the pore diameter of 2 nm or less in the silica particles before washing and after sintering at 600° C. obtained from the pore distribution curve in the nitrogen gas adsorption method to the maximum frequency value $F_{BEFORE}$ of the pore diameter of 2 nm or less in the silica particles before washing obtained from the pore distribution curve in the nitrogen gas adsorption method is 5 or more and 20 or less, and, from the viewpoint of preventing the increase in electrostatic capacitance, is preferably 5 or more and 15 or less, and more preferably 7 or more and 12 or less.

In the silica particle according to the second exemplary embodiment, the ratio $F_{SINTERING}/F_{BEFORE}$ of the maximum frequency value $F_{SINTERING}$ of the pore diameter of 2 nm or less in the silica particles before washing and after sintering at 600° C. obtained from the pore distribution curve in the nitrogen gas adsorption method to the maximum frequency value $F_{BEFORE}$ of the pore diameter of 2 nm or less in the silica particles before washing obtained from the pore distribution curve in the nitrogen gas adsorption method is preferably 5 or more and 20 or less, more preferably 5 or more and 15 or less, and still more preferably 7 or more and 12 or less, from the viewpoint of preventing the increase in electrostatic capacitance.

The specific method for setting the ratio $F_{SINTERING}/F_{BEFORE}$ before and after sintering within the above range is not particularly limited, and examples thereof include a method of subjecting the silica particle to a surface treatment with a quaternary ammonium salt using a supercritical fluid, a method of obtaining a silica particle in which aluminum atoms are combined with a silica particle as an aluminum compound and subjecting the particle surface thereof to a surface treatment with a quaternary ammonium salt, and a spray dry method in the production of the silica particle.

The pore distribution curve in the nitrogen gas adsorption method is derived from derived, by using various calculation formulas, from an adsorption isotherm obtained by measuring an adsorption amount of nitrogen gas. First, silica particles as an adsorbent are cooled to a liquid nitrogen temperature (−196° C.), nitrogen gas is introduced, and an adsorption amount of the nitrogen gas is determined by a constant volume method or a gravimetric method. The adsorption isotherm is created by gradually increasing the pressure of the nitrogen gas to be introduced and plotting the adsorption amount of the nitrogen gas with respect to each equilibrium pressure. From this adsorption isotherm, a pore distribution curve whose frequency is on the vertical axis and pore diameter on the horizontal axis is obtained by a calculation formula of a micropore analysis method (MP method), a Horvath-Kawazoe method (HK method), a Saito-Foley method (SF method), a Cheng-Yang method (CY method), or the like. From the obtained pore distribution curve, the maximum frequency value when the pore diameter is 2 nm or less is obtained.

Electrostatic Capacitance

In the silica particle according to the first exemplary embodiment, the ratio $C_{AFTER}/C_{BEFORE}$ of the electrostatic capacitance $C_{AFTER}$ of the resin particles whose surface is adhered with the silica particles separated from a mixture obtained by mixing the resin particles, whose surface is adhered with the silica particles after washing, with ferrite powders under specific conditions to the electrostatic capacitance $C_{BEFORE}$ of the resin particles whose surface is adhered with the silica particles separated from a mixture obtained by mixing the resin particles, whose surface is adhered with the silica particles before washing, with the ferrite powders under the specific conditions is preferably 1.5 or less, more preferably 1.3 or less, and still more preferably 1.1 or less, from the viewpoint of preventing the increase in electrostatic capacitance.

In the silica particle according to the second exemplary embodiment, the ratio $C_{AFTER}/C_{BEFORE}$ of the electrostatic capacitance $C_{AFTER}$ of the resin particles whose surface is adhered with the silica particles separated from a mixture obtained by mixing the resin particles, whose surface is adhered with the silica particles after washing, with ferrite powders under specific conditions to the electrostatic capacitance $C_{BEFORE}$ of the resin particle whose surface is adhered with the silica particles separated from a mixture obtained by mixing the resin particles, whose surface is adhered with the silica particles before washing, with the ferrite powders under the specific conditions is 1.5 or less, and, from the viewpoint of preventing the increase in electrostatic capacitance, is preferably 1.3 or less, and more preferably 1.1 or less.

The specific method for setting the ratio $C_{AFTER}/C_{BEFORE}$ before and after washing within the above range is not particularly limited, and examples thereof include a method of subjecting the silica particle to a surface treatment with a quaternary ammonium salt using a supercritical fluid in the production of the silica particle.

The resin particles are not particularly limited, and an acrylic resin (e.g., MA1010 manufactured by Nippon Shokubai Co., Ltd.) is used.

As the ferrite powders, soft ferrite (e.g., KNI106GSM manufactured by JFE Chemical Corporation) is used.

The specific conditions refer to the following conditions.
Mass ratio: silica particles/resin particles=2/100, silica-adhered resin particles/ferrite powders=1/10
Mixing temperature: room temperature (10° C.)
Mixing device: Turbula shaker mixer (e.g., T2F manufactured by Shinmaru Enterprises Corporation)
Mixing time: 5 min
Mixing speed: 49 rpm The electrostatic capacitance is measured as follows.

2 g of the sample after stirring with the Turbula shaker mixer is charged into a metal container covered with a 20 µm-mesh stainless steel wire mesh, and the electrostatic capacitance is measured with a charge amount measurement device (e.g., TB-200 manufactured by Toshiba Chemical Corporation).

Method of Washing Silica Particles

The washing of the silica particles is performed as follows.

Into a 20 ml lab screw tube, 1 g of silica particles, 2.5 g of ethanol, and 2.5 g of ion-exchanged water are charged and mixed with an ultrasonic cleaner (e.g., a tabletop ultrasonic cleaner W-113 manufactured by Honda Electronics Co., Ltd., frequency: 45 Hz), to obtain a mixture. Thereafter, the mixture is put into a centrifuge (e.g., FB-4000 manufactured by KURABO INDUSTRIES LTD.) at 10,000 rpm for 30 minutes, the supernatant is discarded, then the precipitated silica particles are taken out twice, and the silica particles are dried. The above silica particles are referred to as the silica particles after washing.

Method of Sintering Silica Particles

The sintering of the silica particles is performed as follows.

Into a 20 ml sintering crucible, 1 g of silica particles is charged, and the silica particles are sintered under a nitrogen atmosphere at 600° C. for 1 hour using a sintering machine (e.g., KM-100 manufactured by Toyo Roshi Kaisha, Ltd.), and the obtained sintered product is used as the silica particles after sintering.

Proportion of Abundance N of Nitrogen Element (N/Si)

In the silica particle according to the exemplary embodiment, the proportion (N/(Silica particles)×100) of the abundance N of the nitrogen element derived from the quaternary ammonium salt detected by oxygen and nitrogen analysis is preferably 0.01% or more, more preferably 0.02% or more and 1.00% or less, and still more preferably 0.03% or more and 0.80% or less, from the viewpoint of preventing the increase in electrostatic capacitance.

The specific method of setting the above proportion (N/(silica particles)×100) within the above range is not particularly limited, and examples thereof include a method of adjusting the ratio, time, or the like of mixing a silica particle-containing suspension with the quaternary ammonium salt in the production of the silica particles.

The oxygen and nitrogen analysis is performed by measuring an integration time for 45 seconds using an oxygen and nitrogen analyzer (e.g., EMGA-920 manufactured by Horiba, Ltd.) to obtain the proportion (N/(total silica particles)×100) of the abundance N of the nitrogen element. In a particle production step, when using a material containing a nitrogen element such as ammonia as a catalyst, a gas chromatograph mass spectrometer (e.g., GCMS-TQ8040NX manufactured by Shimadzu Corporation) is used, the proportion (N/(total silica particles)×100) of the abundance N of the nitrogen element in a nitrogen element-containing material used in the production step is obtained from a calibration curve of the known material and a difference between the obtained proportions is obtained to obtain the abundance of the nitrogen element derived from the quaternary ammonium salt.

In the aluminum-containing silica particle according to the exemplary embodiment, the proportion (N/(silica particles)×100) of the abundance N of the nitrogen element derived from the quaternary ammonium salt detected by oxygen and nitrogen analysis is preferably 0.01% or more and 1.00% or less, more preferably 0.02% or more and 1.00% or less, and still more preferably 0.03% or more and 0.80% or less, from the viewpoint of preventing the increase in electrostatic capacitance.

Presence Proportion of Each Element Detected by X-Ray Photoelectron Spectroscopy In the aluminum-containing silica particle according to the exemplary embodiment, a ratio Si/Al of an abundance Si of a silicon element detected by X-ray photoelectron spectroscopy to an abundance Al of an aluminum element detected by X-ray photoelectron spectroscopy is preferably 0.01 or more and 0.30 or less, more preferably 0.03 or more and 0.2 or less, and still more preferably 0.05 or more and 0.1 or less, from the viewpoint of preventing the increase in electrostatic capacitance.

The specific method for setting the above ratio Si/Al within the above range is not particularly limited, and examples thereof include a method of adjusting the ratio, time, or the like of mixing an untreated silica particle-containing suspension with an aluminum compound in the production of the aluminum-containing silica particle.

In the silica particles according to the exemplary embodiment, the average pore diameter is preferably 0.55 nm or more and 2.00 nm or less, more preferably 0.55 nm or more and 1.50 nm or less, and still more preferably 0.55 nm or more and 1.00 nm or less, from the viewpoint of preventing the increase in electrostatic capacitance.

The average pore diameter of the silica particles is derived, by using various calculation formulas, from an adsorption isotherm obtained by measuring an adsorption amount of nitrogen gas. First, silica particles as an adsorbent are cooled to a liquid nitrogen temperature (−196° C.), nitrogen gas is introduced, and the adsorption amount of the nitrogen gas is determined by a constant volume method or a gravimetric method. The adsorption isotherm is created by gradually increasing the pressure of the nitrogen gas to be introduced and plotting the adsorption amount of the nitrogen gas with respect to each equilibrium pressure. From this adsorption isotherm, the average pore diameter is obtained by a calculation formula of a micropore analysis method (MP method), a Horvath-Kawazoe method (HK method), a Saito-Foley method (SF method), a Cheng-Yang method (CY method), or the like.

Adsorption measurement of the nitrogen gas is performed under liquid nitrogen (77.4 K) using a high-precision gas adsorption amount measurement device (e.g., BELSORP MAX II manufactured by MicrotracBEL Corp.) and ultra-high purity nitrogen gas.

The specific method for setting the average pore diameter of the silica particle within the above range is not particularly limited, and examples thereof include: 1) a method of adjusting a liquid composition during granulation; 2) a method of adjusting a dropping speed during granulation of particles; and 3) a method of adjusting a drying temperature.

In the silica particles according to the exemplary embodiment, the number average particle diameter is preferably 5 nm or more and 300 nm or less, more preferably 5 nm or more and 200 nm or less, and still more preferably 5 nm or more and 100 nm or less, from the viewpoint of preventing the increase in electrostatic capacitance.

The number average particle diameter of the silica particles is obtained as follows.

The silica particles are imaged with a scanning electron microscope (SEM), and the equivalent circle diameter (nm) of each 100 optionally selected primary particles is obtained by image analysis. Then, the circle-equivalent diameter corresponding to the cumulative percentage of 50% (that is, corresponding to the $50^{th}$ primary particle) in a circle-equivalent diameter distribution drawn from the side of the small diameter is defined as the number average particle diameter.

The silica particle according to the exemplary embodiment is preferably a hydrophobically treated particle from the viewpoint of preventing the increase in electrostatic capacitance.

[Material of Silica Particle]
(Quaternary Ammonium Salt)

The silica particle according to the exemplary embodiment contain a quaternary ammonium salt.

The quaternary ammonium salt may be used alone or in combination of two or more thereof.

The quaternary ammonium salt is not particularly limited, and known quaternary ammonium salts may be applied.

The quaternary ammonium salt preferably contains a compound represented by a general formula (AM), from the viewpoint of preventing the increase in electrostatic capacitance. The compound represented by the general formula (AM) may be used alone or in combination of two or more thereof.

general formula (AM)

In the general formula (AM), $R^1$, $R^2$, $R^3$ and $R^4$ each independently represent an optionally substituted alkyl group, aralkyl group or aryl group, and $X^-$ represents an anion.

Examples of the alkyl group represented by $R^1$ to $R^4$ include a linear alkyl group having 1 or more and 20 or less carbon atoms and a branched alkyl group having 3 or more and 20 or less carbon atoms.

Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, and a n-hexadecyl group.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Among these, the alkyl group represented by $R^1$ to $R^4$ is preferably an alkyl group having 1 or more and 15 or less carbon atoms, such as a methyl group, an ethyl group, a butyl group, and a tetradecyl group.

Examples of the aralkyl group represented by $R^1$ to $R^4$ include an aralkyl group having 7 or more and 30 or less carbon atoms.

Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracylmethyl group, and a phenyl-cyclopentylmethyl group.

Among these, the aralkyl group represented by $R^1$ to $R^4$ is preferably an aralkyl group having 7 or more and 15 or less carbon atoms, such as a benzyl group, a phenylethyl group, a phenylpropyl group, and a 4-phenylbutyl group.

Examples of the aryl group represented by $R^1$ to $R^4$ include an aryl group having 6 or more and 20 or less carbon atoms.

Examples of the aryl group having 6 or more and 20 or less carbon atoms include a phenyl group, a pyridyl group, and a naphthyl group.

Among these, the aryl group represented by $R^1$ to $R^4$ is preferably an aryl group having 6 or more and 10 or less carbon atoms, such as a phenyl group.

Examples of the anion represented by $X^-$ include an organic anion and an inorganic anion.

Examples of the organic anion include a polyfluoroalkylsulfonate ion, a polyfluoroalkylcarboxylate ion, a tetraphenylborate ion, an aromatic carboxylate ion, and an aromatic sulfonate ion (e.g., a 1-naphthol-4-sulfonate ion).

Examples of the inorganic anion include $MoO_4^{2-}$, $OH^-$, $F^-$, $Fe(CN)_6^{3-}$, $Cl^-$, B, $NO_2^-$, $NO_3^-$, $CO_3^{2-}$, $PO_4^{3-}$, and $SO_4^{2-}$.

In the general formula (AM), two or more of $R^1$, $R^2$, $R^3$ and $R^4$ may be linked to each other to form a ring. Examples of the ring formed by linking two or more of $R^1$, $R^2$, $R^3$ and $R^4$ to each other include an alicyclic ring having 2 or more and 20 or less carbon atoms and heterocyclic amine having 2 or more and 20 and or less carbon atoms.

In the silica particle according to the exemplary embodiment, it is preferable that, in the compound represented by the general formula (AM), $R^1$, $R^2$, $R^3$ and $R^4$ each independently represent an optionally substituted alkyl group having 1 or more and 16 or less carbon atoms or an optionally substituted aralkyl group having 7 or more and 10 or less carbon atoms, from the viewpoint of preventing the increase in electrostatic capacitance.

Examples of the structure other than $X^-$ in the compound represented by the general formula (AM) are shown below, but the exemplary embodiment is not limited thereto.

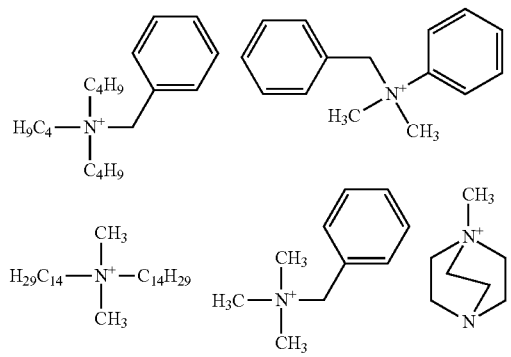

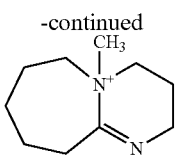

(Aluminum atom)

The silica particle according to the exemplary embodiment may contain an aluminum atom.

The aluminum atom may be combined with the silica particle as an aluminum compound. Examples of the aluminum compound include compounds in which an aluminum atom is bonded to an organic group via an oxygen atom.

Examples of the organic group, which contains an oxygen atom, bonded to the aluminum atom via the oxygen atom in the aluminum compound preferably include at least one group selected from the group consisting of an alkoxy group, an acyloxy group, an alkylacetoacetate group which is an anion of an alkylacetoacetate compound, and an acetylacetonato group which is an anion of an acetylacetone compound, and more preferably at least one group selected from the group consisting of an alkoxy group and an alkylacetoacetate group which is an anion of an alkylacetoacetate compound.

Specific examples of the aluminum compound in which an organic group is bonded to an aluminum atom via an oxygen atom include: aluminum alkoxides such as aluminum methoxide, aluminum ethoxide, aluminum n-propoxide, aluminum i-propoxide, aluminum n-butoxide, aluminum i-butoxide, aluminum sec-butoxide, and aluminum tert-butoxide; chelates such as aluminum ethyl acetoacetate diisopropylate, aluminum trisethylacetoacetate, aluminum bisethylacetoacetate monoacetylacetonate, and aluminum trisacetylacetonate; aluminum oxide acylates such as aluminum oxide 2-ethylhexanoate and aluminum oxide laurate; complexes of aluminum with β-diketones such as acetylacetonate; complexes of aluminum with β-ketoesters such as ethyl acetoacetate; and complexes of aluminum with carboxylic acids such as acetic acid, butyric acid, lactic acid, and citric acid.

The aluminum compound is preferably an aluminum compound having one or more (more preferably two or more) alkoxy groups from the viewpoint of controllability of reaction rate, or the shape, particle diameter, and particle diameter distribution of the silica particles to be obtained. That is, the aluminum compound is preferably an aluminum compound in which one or more (more preferably two or more) alkoxy groups, which is an alkyl group bonded to an aluminum atom via one oxygen atom, are bonded to the aluminum atom. The number of the carbon atoms in the alkoxy group is preferably 8 or less, and more preferably 2 or more and 4 or less, from the viewpoint of controllability of reaction rate, or the shape, particle diameter, and particle diameter distribution of the silica particles to be obtained.

Among these, the aluminum compound is particularly preferably at least one compound selected from the group consisting of aluminum ethyl acetoacetate diisopropylate, aluminum trisethylacetoacetate, aluminum bisethylacetoacetate monoacetylacetonate, and aluminum trisacetylacetonate, from the viewpoint of hardness uniformity.

[Application]

The silica particle according to the exemplary embodiment may be applied to various fields such as fillers, abrasives, toners, and cosmetics.

In particular, by adding the silica particles according to the exemplary embodiment to tire rubber, the accumulation of static electricity in the tire may be prevented, and the adverse effects of electromagnetic noise on electronic devices may be prevented.

«Method for Producing Silica Particle»

The method for producing the silica particle according to the exemplary embodiment includes: a preparing step of preparing a silica particle-containing suspension; and then a first surface treatment step of mixing the suspension with a quaternary ammonium salt to obtain a powder in which the silica particle is surface-treated with the quaternary ammonium salt using a supercritical fluid.

The method for producing the silica particle according to the exemplary embodiment includes a first surface treatment step. In the first surface treatment step, by circulating the supercritical fluid in the presence of the quaternary ammonium salt, the quaternary ammonium salt tends to be immobilized on the surface of the silica particle. Therefore, the quaternary ammonium salt makes it difficult to perform triboelectric charging due to the presence of the charge having a polarity opposite to that of the silica surface on the particle surface, and it is easy to produce the silica particle in which the increase in electrostatic capacitance is prevented.

Hereinafter, the steps of the production method according to the exemplary embodiment will be described in detail.

[Preparing Step]

The method for producing the silica particle according to the exemplary embodiment includes a preparing step.

In the preparing step, a silica particle-containing suspension is prepared.

Examples of the preparing step include:
(i) a step of mixing an alcohol-containing solvent with silica particles to prepare a silica particle suspension; and
(ii) a step of granulating silica particles by a sol-gel method to obtain a silica particle suspension.

Examples of the silica particles for use in the above (i) include sol-gel silica particles (silica particles obtained by a sol-gel method), aqueous colloidal silica particles, alcoholic silica particles, fumed silica particles obtained by a gas phase method, and fused silica particles.

The alcohol-containing solvent for use in the above (i) may be a solvent containing an alcohol alone, or may be a mixed solvent containing an alcohol and another solvent. Examples of the alcohol include lower alcohols such as methanol, ethanol, n-propanol, isopropanol and butanol. Examples of another solvent include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of a mixed solvent, the proportion of alcohol is preferably 80 mass % or more, and more preferably 90 mass % or more.

The preparing step may include, for example, the step (1-a) of preparing a silica particle suspension containing silica particles.

The step (1-a) is preferably a step of granulating silica particles by a sol-gel method to obtain a silica particle suspension.

More specifically, the step (1-a) is a sol-gel method including an alkali catalyst solution preparing step of preparing an alkali catalyst solution containing an alkali catalyst in an alcohol-containing solvent, and a silica particle producing step of producing silica particles by supplying a tetraalkoxysilane and an alkali catalyst into the alkali catalyst solution.

The alkali catalyst solution preparing step is preferably a step of preparing an alcohol-containing solvent and mixing the solvent with an alkali catalyst to obtain an alkali catalyst solution.

The alcohol-containing solvent may be a solvent containing an alcohol alone, or may be a mixed solvent containing an alcohol and another solvent. Examples of the alcohol include lower alcohols such as methanol, ethanol, n-propanol, isopropanol and butanol. Examples of another solvent include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of a mixed solvent, the proportion of alcohol is preferably 80 mass % or more, and more preferably 90 mass % or more.

The alkali catalyst is a catalyst for accelerating the reaction of the tetraalkoxysilane, which is a hydrolysis reaction and a condensation reaction, and examples thereof include basic catalysts such as ammonia, urea and monoamine, and ammonia is particularly preferred.

The concentration of the alkali catalyst in the alkali catalyst solution is preferably 0.5 mol/L or more and 1.0 mol/L or less, more preferably 0.6 mol/L or more and 0.8 mol/L or less, and still more preferably 0.65 mol/L or more and 0.75 mol/L or less, from the viewpoint of increasing the particle diameter uniformity and circularity of the silica particles produced.

The silica particle producing step is a step of supplying the tetraalkoxysilane and an alkali catalyst to an alkali catalyst solution and reacting the tetraalkoxysilane (hydrolysis reaction and condensation reaction) in the alkali catalyst solution to produce silica particles.

In the silica particle producing step, core particles are produced by the reaction of the tetraalkoxysilane in the initial supply of the tetraalkoxysilane (nucleus particle producing step), and then the core particles grow (nuclear particle growth step), to produce silica particles.

Examples of the tetraalkoxysilane include tetramethoxysilane, tetraethoxysilane, tetrapropoxysilane, and tetrabutoxysilane. From the viewpoint of controllability of reaction rate or shape uniformity of the silica particles produced, tetramethoxysilane or tetraethoxysilane is preferred.

Examples of the alkali catalyst to be supplied into the alkali catalyst solution include basic catalysts such as ammonia, urea, monoamine, and a quaternary ammonium salt, and ammonia is particularly preferred. The alkali catalyst to be supplied together with the tetraalkoxysilane may be of the same type as the alkali catalyst previously contained in the alkali catalyst solution, or may be of a different type from the alkaline catalyst previously contained in the alkaline catalyst solution, but it is preferably the same type. The supply method of supplying the tetraalkoxysilane and the alkali catalyst to the alkali catalyst solution may be a continuous supply method or an intermittent supply method.

In the silica particle producing step, the temperature of the alkali catalyst solution (specifically, the temperature of the alkali catalyst solution at the time of supplying the tetraalkoxysilane and an alkali catalyst thereto) is preferably 5° C. or higher and 50° C. or lower, and more preferably 15° C. or higher and 40° C. or lower.

The method of preparing a suspension containing aluminum atom-containing silica particles is not particularly limited, and for example, the suspension containing an aluminum atom-containing silica particles may be prepared by performing a surface treatment of the silica particles with an aluminum compound.

Hereinafter, silica particles surface-treated with an aluminum compound are also referred to as aluminum-bonded silica particles, and a suspension containing silica particles surface-treated with an aluminum compound (that is, silica particles containing an aluminum atom) is also referred to as an aluminum-bonded silica particle suspension.

The aluminum-bonded silica particle suspension contains, for example, the alcohol-containing solvent and the aluminum-bonded silica particles. The alcohol-containing solvent may be a solvent containing an alcohol alone, or may be a mixed solvent containing an alcohol and another solvent. Examples of the alcohol include lower alcohols such as methanol, ethanol, n-propanol, isopropanol and butanol. Examples of another solvent include water; ketones such as acetone, methyl ethyl ketone, and methyl isobutyl ketone; cellosolves such as methyl cellosolve, ethyl cellosolve, butyl cellosolve, and cellosolve acetate; and ethers such as dioxane and tetrahydrofuran. In the case of a mixed solvent, the proportion of alcohol is preferably 80 mass % or more, and more preferably 90 mass % or more.

The preparing step may further include, for example, a step (1-b) of mixing the silica particle suspension with an aluminum compound, and subjecting the silica particles to an aluminum composite treatment with the aluminum compound.

The step (1-b) is a step of mixing the silica particle suspension with an aluminum compound, and subjecting the silica particles to an aluminum composite treatment with the aluminum compound.

After the step (1-b), a functional group (e.g., an organic group such as an alkoxy group) of the aluminum compound reacts with a silanol group on the surface of the silica particles to produce aluminum-bonded silica particles.

The step (1-b) is performed, for example, by a method of adding an aluminum compound to the silica particle suspension and reacting the substances under stirring, for example, in a temperature range of 20° C. or higher and 80° C. or lower.

The aluminum compound is preferably a compound having an organic group bonded to an aluminum atom via an oxygen atom. Examples of the compound having an organic group bonded to an aluminum atom via an oxygen atom include: aluminum alkoxides such as aluminum methoxide, aluminum ethoxide, aluminum n-propoxide, aluminum i-propoxide, aluminum n-butoxide, aluminum i-butoxide, aluminum sec-butoxide, and aluminum tert-butoxide; chelates such as aluminum ethyl acetoacetate diisopropylate, aluminum trisethylacetoacetate, aluminum bisethylacetoacetate monoacetylacetonate, and aluminum trisacetylacetonate; aluminum oxide acylates such as aluminum oxide 2-ethylhexanoate and aluminum oxide laurate; complexes of aluminum with β-diketones such as acetylacetonate; complexes of aluminum with β-ketoesters such as ethyl acetoacetate; complexes of aluminum with amines such as triethanolamine; and complexes of aluminum with carboxylic acids such as acetic acid, butyric acid, lactic acid, and citric acid.

The aluminum compound is preferably an aluminum compound having one or more (preferably two or more) alkoxy groups from the viewpoint of controllability of reaction rate, or the shape, particle diameter, and particle diameter distribution of the aluminum-bonded silica particles to be produced. That is, the aluminum compound is preferably an aluminum compound in which one or more (preferably two or more) alkoxy groups, which is an alkyl group bonded to an aluminum atom via one oxygen atom, are bonded to the aluminum atom. The number of the carbon atoms in the alkoxy group is preferably 8 or less, and more preferably 2 or more and 4 or less, from the viewpoint of controllability of reaction rate, or the shape, particle diameter, and particle diameter distribution of the aluminum-bonded silica particles to be produced.

Preferred examples of the aluminum compound include chelates such as aluminum ethyl acetoacetate diisopropylate, aluminum trisethylacetoacetate, aluminum bisethylacetoacetate monoacetylacetonate, and aluminum trisacetylacetonate.

The step (1-b) is preferably performed by mixing the silica particle suspension with an alcohol liquid containing an aluminum compound in an alcohol. Therefore, it is preferable that the production method according to the exemplary embodiment further includes a step of preparing an alcohol liquid containing an aluminum compound in an alcohol, and the step is performed in advance.

Examples of the alcohol include lower alcohols such as methanol, ethanol, n-propanol, isopropanol and butanol.

When the aluminum compound is a compound having an alkoxy group, the alcohol is preferably an alcohol having a carbon number smaller than that of the alkoxy group of the aluminum compound (specifically, e.g., the carbon number difference is 2 or more and 4 or less), from the viewpoint of controllability of reaction rate, or the shape, particle diameter, and particle diameter distribution of the aluminum-bonded silica particles to be produced.

The alcohol may be the same type as or may be a different type from the alcohol contained in the silica particle suspension, but it is preferably the same type.

In the alcohol liquid containing an aluminum compound in an alcohol, the concentration of the aluminum compound is preferably 0.05 mass % or more and 10 mass % or less, and more preferably 0.1 mass % or more and 5 mass % or less.

From the viewpoint of controllability of reaction rate, or the shape, particle diameter, and particle diameter distribution of the aluminum-bonded silica particles to be produced, the lower limit of the total amount of the aluminum compounds is preferably 0.001 mass % or more, more preferably 0.01 mass % or more, and still more preferably 0.1 mass % or more, and the upper limit thereof is preferably 10 mass % or less, more preferably 5 mass % or less, and still more preferably 3 mass % or less, based on the solid content of the silica particle suspension.

The surface treatment condition of the silica particles with the aluminum compound is not particularly limited, and the surface treatment is performed by, for example, reacting the aluminum compound in a temperature range of 5° C. or higher and 50° C. or lower under stirring.

[First Surface Treatment Step]

The method for producing the silica particle according to the exemplary embodiment includes a first surface treatment step.

In the first surface treatment step, the suspension and a quaternary ammonium salt are mixed to obtain a powder in which the silica particle is surface-treated with the quaternary ammonium salt. At that time, a supercritical fluid may also be used.

Preferred examples of the quaternary ammonium salt include those similar to those exemplified as the quaternary ammonium salt in the silica particle according to the exemplary embodiment.

The total amount of the quaternary ammonium salts is preferably 0.5 mass % or more, more preferably 1.5 mass % or more and 10 mass % or less, and still more preferably 2 mass % or more and 5 mass % less, based on the solid content of the silica particle-containing suspension.

The surface treatment condition of the silica particles with the quaternary ammonium salt is not particularly limited, and the surface treatment is performed by, for example, reacting the quaternary ammonium salt in a temperature range of 20° C. or higher and 50° C. or lower under stirring.

The first surface treatment step is preferably performed by, for example, mixing the silica particle suspension with an alcohol liquid containing a quaternary ammonium salt in an alcohol. Therefore, it is preferable that the production method according to the exemplary embodiment further includes a step of preparing an alcohol liquid containing a quaternary ammonium salt in an alcohol, and the step is performed in advance.

The alcohol may be the same type as or may be a different type from the alcohol contained in the silica particle suspension, but it is preferably the same type.

In the alcohol liquid containing a quaternary ammonium salt in an alcohol, the concentration of the quaternary ammonium salt is preferably 0.05 mass % or more and 10 mass % or less, and more preferably 0.1 mass % or more and 6 mass % or less.

In the case of using a supercritical fluid, usable substances include carbon dioxide, water, methanol, ethanol, and acetone. The first surface treatment step is preferably a step using supercritical carbon dioxide from the viewpoint of treatment efficiency and the viewpoint of preventing generation of coarse particles.

In the case of using supercritical carbon dioxide, the first surface treatment step may be specifically performed by the following operations.

The silica particle-containing suspension and the quaternary ammonium salt are charged into a closed reactor and mixed. Next, liquefied carbon dioxide is introduced into the closed reactor, then the closed reactor is heated and the pressure inside the closed reactor is increased by a high-pressure pump to bring the carbon dioxide in the closed reactor into a supercritical state. Then, liquefied carbon dioxide is flown into the closed reactor and the supercritical carbon dioxide is flown out of the closed reactor, to circulate the supercritical carbon dioxide through the suspension in the closed reactor. While the supercritical carbon dioxide circulates through the suspension, a solvent dissolves in the supercritical carbon dioxide and flows together with the supercritical carbon dioxide flowing out of the closed reactor, so that the solvent is removed.

The temperature and pressure in the closed reactor described above are the temperature and pressure at which carbon dioxide is brought into a supercritical state. Since the critical point of carbon dioxide is 31.1° C./7.38 MPa, the temperature is, for example, 40° C. or higher and 200° C. or lower and the pressure is, for example, 10 MPa or more and 30 MPa or less.

The flow rate of the supercritical fluid in the first surface treatment step is preferably 80 mL/s or more and 240 mL/s or less.

[Second Surface Treatment Step]

The method for producing the silica particle according to the exemplary embodiment may further include a second surface treatment step after the first surface treatment step.

In the second surface treatment step, the powder is surface-treated with an organosilicon compound.

After the second surface treatment step, the functional group of the organosilicon compound reacts with the OH group on the surface of the silica particles, and for example, silica particles containing an atomic group of —Si—O—Si—R (R is an organic group) on the surface tend to be produced. In addition, using a supercritical fluid is preferred since the reaction efficiency between the organosilicon compound and the surface of the silica particles is improved and a surface treatment with a high degree is performed.

Examples of substances used as the supercritical fluid include carbon dioxide, water, methanol, ethanol, and acetone. The second surface treatment step is preferably a step using supercritical carbon dioxide from the viewpoint of treatment efficiency and the viewpoint of preventing generation of coarse particles.

Specifically, the second surface treatment step is performed, for example, by the following operations.

Silica particles surface-treated with a quaternary ammonium salt, and an organosilicon compound are charged into a closed reactor equipped with a stirrer. Next, liquefied carbon dioxide is introduced, then the closed reactor is heated and the pressure inside the closed reactor is increased by a high-pressure pump to bring the carbon dioxide in the closed reactor into a supercritical state. Then, the stirrer is operated to stir the inside of the reaction system.

The temperature and pressure in the closed reactor described above are the temperature and pressure at which carbon dioxide is brought into a supercritical state. Since the critical point of carbon dioxide is 31.1° C./7.38 MPa, the temperature is, for example, 40° C. or higher and 200° C. or lower and the pressure is, for example, 10 MPa or more and 30 MPa or less. The stirring time is preferably 10 minutes or longer and 24 hours or shorter, more preferably 20 minutes or longer and 120 minutes or shorter, and still more preferably 20 minutes or longer and 90 minutes or shorter.

Examples of the organosilicon compound include:
- a silane compound having a lower alkyl group, such as methyltrimethoxysilane, dimethyldimethoxysilane, trimethylchlorosilane, and trimethylmethoxysilane;
- a silane compound having a vinyl group, such as vinyltrimethoxysilane and vinyltriethoxysilane;
- a silane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane;
- a silane compound having a styryl group, such as p-styryltrimethoxysilane and p-styryltriethoxysilane;
- a silane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, and N-phenyl-3-aminopropyltrimethoxysilane;
- a silane compound having an isocyanate alkyl group, such as 3-isocyanatopropyltrimethoxysilane and 3-isocyanatopropyltriethoxysilane; and
- a silazane compound such as hexamethyldisilazane and tetramethyldisilazane.

The obtained silica particles may be crushed or sieved to remove coarse particles and aggregates. The crushing is performed by using a dry crushing device such as a jet mill, a vibration mill, a ball mill, and a pin mill. The sieving is performed by using, for example, a vibration sieving machine, a wind sieving machine or the like.

[Solvent Removal Step]

The method for producing the silica particle according to the exemplary embodiment may further include a solvent removal step, if necessary.

In the solvent removal step, the solvent is removed from the suspension containing silica particles-surface-treated with the quaternary ammonium salt using a supercritical fluid to obtain a powder. Examples of the method of removing the solvent include heat drying, spray drying, and supercritical drying. Since, in the heat drying and the spray drying, surface tension tends to act between particles at the end of the drying, coarse particles are likely to be generated due to particle aggregation, but it is possible to prevent the generation of the coarse particles by performing a surface treatment with an organosilicon compound.

In the supercritical drying, when the solvent is removed with a supercritical fluid, it is difficult for the surface tension to act between particles, and the primary particles contained in the suspension are dried in a state where aggregation is prevented. Therefore, it is easy to obtain silica particles whose surface is treated with an aluminum compound and whose particle diameter is highly uniform.

Examples of substances used as the supercritical fluid include carbon dioxide, water, methanol, ethanol, and acetone. The solvent removal step is preferably a step using supercritical carbon dioxide from the viewpoint of treatment efficiency and the viewpoint of preventing generation of coarse particles.

Specifically, the solvent removal step is performed, for example, by the following operations.

The suspension is charged into a closed reactor, and then liquefied carbon dioxide is introduced. Then, the closed reactor is heated and the pressure inside the closed reactor is increased by a high-pressure pump to bring the carbon dioxide in the closed reactor into a supercritical state. Then, liquefied carbon dioxide is flown into the closed reactor and the supercritical carbon dioxide is flown out of the closed reactor, to circulate the supercritical carbon dioxide through the suspension in the closed reactor. While the supercritical carbon dioxide circulates through the suspension, a solvent dissolves in the supercritical carbon dioxide and flows together with the supercritical carbon dioxide flowing out of the closed reactor, so that the solvent is removed.

The temperature and pressure in the closed reactor described above are the temperature and pressure at which carbon dioxide is brought into a supercritical state. Since the critical point of carbon dioxide is 31.1° C./7.38 MPa, the temperature is, for example, 40° C. or higher and 200° C. or lower and the pressure is, for example, 10 MPa or more and 30 MPa or less.

The flow rate of the supercritical fluid in the solvent removal step is preferably 80 mL/s or more and 240 mL/s or less.

The method for producing the silica particle according to the exemplary embodiment may be, for example, a production method including the preparing step, the first surface treatment step, the second surface treatment step, and the solvent removal step in this order.

EXAMPLES

Hereinafter, the exemplary embodiment of the invention will be described in detail with reference to Examples, but the exemplary embodiment of the invention is not limited to these Examples. In the following description, all "%" are based on mass unless otherwise specified.

«Prodcution of Silica Particles»

Examples 1 to 7

(Preparing Step)

A silica particle-containing suspension in each example is prepared as described below.

—Preparation of Alkali Catalyst Solution—

Into a glass reactor equipped with a metal stir bar, a dripping nozzle and a thermometer, methanol, ion-exchanged water, and 10% aqueous ammonia ($NH_4OH$) in amounts shown in Table 1 are added and mixed with stirring to obtain an alkali catalyst solution.

—Granulation of Silica Particles by Sol-Gel Method—

The temperature of the alkali catalyst solution is adjusted to 25° C., and the alkali catalyst solution is replaced with nitrogen. Then, while stirring the alkali catalyst solution, tetramethoxysilane (TMOS) in an amount shown in Table 1 and 176 parts by mass of aqueous ammonia ($NH_4OH$) having a catalyst ($NH_3$) concentration of 4.4% are simultaneously added dropwise, to obtain a silica particle suspension.

—Preparation of Alcohol Liquid Containing Quaternary Ammonium Salt—

An alcohol liquid is prepared by diluting, with butanol, a quaternary ammonium salt of the type and concentration shown in Table 1.

(First Surface Treatment Step)

The temperature of the silica particle suspension is adjusted to 25° C., and the alcohol liquid adjusted to 25° C. is added thereto. At this time, the alcohol liquid is added such that the concentration of the quaternary ammonium salt is the amount shown in Table 1 based on 100 parts by mass of the solid content of the silica particle suspension. Then, the mixture is stirred at 30° C. for 30 minutes to obtain a suspension containing a quaternary ammonium salt-containing silica particle.

Subsequently, 300 parts by mass of the suspension containing a quaternary ammonium salt-containing silica particle is charged into a reaction tank, $CO_2$ is charged while stirring, and the temperature and the pressure inside the reaction tank are raised to 120° C. and 20 MPa, respectively. $CO_2$ is allowed to flow in and out at a flow rate of 5 L/min while stirring in a state of maintaining the temperature and the pressure. Thereafter, the solvent is removed over 120 minutes to obtain a powder.

(Second Surface Treatment Step)

To 100 parts by mass of the powder remaining in the reaction tank, 100 parts by mass of 1,1,1,3,3,3-hexamethyldisilazane (HMDS) is added. While stirring the materials, the inside of the reaction tank is filled with $CO_2$, and the temperature and the pressure inside the reaction tank are raised to 150° C. and 15 MPa, respectively. The stirring is continued for 30 minutes while maintaining the temperature and the pressure. Then, the pressure is released to atmospheric pressure and the temperature is cooled to room temperature (25° C.). Thereafter, the stirrer is stopped, and silica particles of respective Examples as powders are obtained.

Example 8

Silica particles are produced in the same manner as in Example 1 except that the second surface treatment step is not performed.

Comparative Example 1

Silica particles are produced in the same manner as in Example 1 except that the first surface treatment step has the following specifications without the surface treatment with the quaternary ammonium salt.

Into a reaction tank, 300 parts by mass of the silica particle suspension is charged, $CO_2$ is charged while stirring, and the temperature and the pressure inside the reaction tank are raised to 120° C. and 20 MPa, respectively. $CO_2$ is allowed to flow in and out at a flow rate of 5 L/min while stirring in a state of maintaining the temperature and the pressure. Thereafter, the solvent is removed over 120 minutes to obtain a powder.

Comparative Example 2

Silica particles are produced based on the production method described in Example 1 of JP-A-2017-039618.

«Production of Aluminum-containing Silica Particles»

Examples 9 to 16

First, a suspension containing an aluminum atom-containing silica particle in each example is prepared as described below.

Into a glass reactor equipped with a metal stir bar, a dripping nozzle and a thermometer, methanol, ion-exchanged water, and 10% aqueous ammonia ($NH_4OH$) in amounts shown in Table 2 are added and mixed with stirring to obtain an alkali catalyst solution.

The temperature of the alkali catalyst solution is adjusted to 25° C., and the alkali catalyst solution is replaced with nitrogen. Then, while stirring the alkali catalyst solution, tetramethoxysilane (TMOS) in an amount shown in Table 2 and 176 parts by mass of aqueous ammonia ($NH_4OH$) having a catalyst ($NH_3$) concentration of 4.4% are simultaneously added dropwise, to obtain a silica particle suspension.

An alcohol liquid diluted with butanol is prepared such that the concentration of the aluminum compound (aluminum ethyl acetoacetate diisopropylate, manufactured by Wako Pure Chemical Company) is 50%.

An alcohol liquid is prepared by diluting, with methanol, a quaternary ammonium salt of the type and concentration shown in Table 2.

The temperature of the silica particle suspension is adjusted to 25° C., and the alcohol liquid adjusted to 25° C. is added thereto. At this time, the alcohol liquid is added such that the aluminum compound is 1 part by mass based on 100 parts by mass of the solid content of the silica particle suspension. Then, stirring is performed for 30 minutes and the surface of the silica particles is surface-treated by reacting with the aluminum compound, to obtain a suspension containing an aluminum atom-containing silica particle.

The temperature of the suspension containing an aluminum atom-containing silica particle is adjusted to 25° C., and the alcohol liquid adjusted to 25° C. is added thereto. At this time, the alcohol liquid is added such that the concentration of the quaternary ammonium salt is the amount shown in Table 2 based on 100 parts by mass of the solid content of the aluminum-bonded silica particle suspension. Then, the stirring is performed for 30 minutes at 30° C., and the surface of the aluminum-bonded silica particles is surface-treated by reacting with the quaternary ammonium salt, to obtain a suspension containing a quaternary ammonium salt- and an aluminum atom-containing silica particle.

To the suspension containing a quaternary ammonium salt- and an aluminum atom-containing silica particle, 30 parts by mass of 1,1,1,3,3,3-hexamethyldisilazane (HMDS) is added. While stirring the materials, the inside of the reaction tank is filled with $CO_2$, and the temperature and the pressure inside the reaction tank are raised to 150° C. and 15 MPa, respectively. In a state of maintaining the temperature and the pressure, while stirring for 30 minutes, $CO_2$ is allowed to flow in and out at a flow rate of 5 L/min, and the solvent is removed over 120 minutes, to obtain silica particles of respective Examples as powders.

Example 17

Silica particles are produced in the same manner as in Example 9 except that the second surface treatment step is not performed.

Comparative Example 3

Silica particles are produced in the same manner as in Example 9 except that the first surface treatment step is not performed.

Comparative Example 4

Silica particles are produced in the same manner as in Example 9 except that the first surface treatment step is not performed and granulation of silica particles by the sol-gel method in the preparing step has the following specifications.

The temperature of the alkali catalyst solution is adjusted to 25° C., and the alkali catalyst solution is replaced with nitrogen. Then, while stirring the alkali catalyst solution, tetramethoxysilane (TMOS) in an amount shown in Table 2, an alcohol liquid containing a quaternary ammonium salt in an amount shown in Table 2, and 176 parts by mass of aqueous ammonia ($NH_4OH$) having a catalyst ($NH_3$) concentration of 4.4% are simultaneously added dropwise, to obtain a silica particle suspension.

TABLE 1

| | Methanol Amount [part] | Ion-exchanged water Amount [part] | Ammonia Amount [part] | TMOS Amount [part] | Quaternary ammonium salt Type | Amount [part] |
|---|---|---|---|---|---|---|
| Example 1 | 320 | 64.8 | 7.2 | 50 | TMBAC | 4 |
| Example 2 | 320 | 64.8 | 7.2 | 50 | P-51 | 4 |
| Example 3 | 320 | 64.8 | 7.2 | 50 | TP-415 | 4 |
| Example 4 | 320 | 64.8 | 7.2 | 50 | Dimethyl distearyl ammonium chloride | 4 |
| Example 5 | 320 | 64.8 | 7.2 | 250 | P-51 | 4 |
| Example 5-2 | 320 | 129.6 | 14.4 | 500 | P-51 | 4 |
| Example 6 | 300 | 70 | 7.2 | 50 | P-51 | 4 |
| Example 7 | 320 | 64.8 | 7.2 | 50 | P-51 | 14 |
| Example 7-2 | 320 | 64.8 | 7.2 | 50 | P-51 | 0.15 |
| Example 8 | 320 | 64.8 | 7.2 | 50 | P-51 | 4 |
| Comparative Example 1 | 320 | 64.8 | 7.2 | 50 | — | 0 |
| Comparative Example 2 | 320 | 64.8 | 7.2 | 50 | P-51 | 4 |

TABLE 2

| | Methanol Amount [part] | Ion-exchanged water Amount [part] | 10% ammonia Amount [part] | TMOS Amount [part] | Aluminum compound Type | Aluminum compound Amount [part] | Quaternary ammonium salt Type | Quaternary ammonium salt Amount [part] |
|---|---|---|---|---|---|---|---|---|
| Example 9 | 320 | 64.8 | 7.2 | 50 | ALCH | 0.5 | TMBAC | 4 |
| Example 10 | 320 | 64.8 | 7.2 | 50 | ALCH | 0.5 | P-51 | 4 |
| Example 11 | 320 | 64.8 | 7.2 | 50 | ALCH | 0.5 | TP-415 | 4 |
| Example 12 | 320 | 64.8 | 7.2 | 50 | ALCH | 0.5 | Dimethyl distearyl ammonium chloride | 4 |
| Example 13 | 320 | 64.8 | 7.2 | 260 | ALCH | 0.5 | P-51 | 4 |
| Example 13-2 | 320 | 129.6 | 14.5 | 520 | ALCH | 0.5 | P-51 | 4 |
| Example 14 | 300 | 70 | 7.2 | 50 | ALCH | 0.5 | P-51 | 4 |
| Example 15 | 320 | 64.8 | 7.2 | 50 | ALCH | 0.05 | P-51 | 4 |
| Example 16 | 320 | 64.8 | 7.2 | 50 | ALCH | 0.5 | P-51 | 15 |
| Example 16-2 | 320 | 64.8 | 7.2 | 50 | ALCH | 0.5 | P-51 | 0.15 |
| Example 17 | 320 | 64.8 | 7.2 | 50 | ALCH | 0.5 | P-51 | 4 |
| Comparative Example 3 | 320 | 64.8 | 7.2 | 50 | ALCH | 0.5 | — | 0 |

TABLE 2-continued

|  | Methanol Amount [part] | Ion-exchanged water Amount [part] | 10% ammonia Amount [part] | TMOS Amount [part] | Aluminum compound Type | Aluminum compound Amount [part] | Quaternary ammonium salt Type | Quaternary ammonium salt Amount [part] |
|---|---|---|---|---|---|---|---|---|
| Comparative Example 4 | 320 | 64.8 | 7.2 | 50 | — | — | TP-415 | 4 |

Table 3 and Table 4 show measurement results of the ratio $F_{BEFORE}/F_{AFTER}$ of the maximum frequency values of the pore diameter of 2 nm or less before and after washing obtained from the pore distribution curve in the nitrogen gas adsorption method, the ratio $F_{SINTERING}/F_{BEFORE}$ of the maximum frequency values of the pore diameter of 2 nm or less before and after sintering obtained from the pore distribution curve in the nitrogen gas adsorption method, the ratio $C_{AFTER}/C_{BEFORE}$ of the electrostatic capacitances of the resin particles whose surface is adhered with silica particle separated from the mixture obtained by mixing the silica particle before and after washing with ferrite powders under the above conditions, the number average particle diameter, the average pore diameter, a ratio Si/Al of an abundance Si of a silicon element detected by X-ray photoelectron spectroscopy to an abundance Al of an aluminum element detected by X-ray photoelectron spectroscopy, and the proportion (N/(silica particles)×100) of the abundance N of the nitrogen element detected by the oxygen and nitrogen analysis of the silica particle in respective examples. The measurement methods are as described above.

In each table, "—" means that the material of the corresponding item is not included.

«Evaluation»

With respect to the silica particles in respective examples, the increase property in electrostatic capacitance is evaluated based on the following methods and criteria. Of the criteria, G1 and G2 are acceptable.

The evaluation method is as follows.

2 g of the produced silica particles containing a quaternary ammonium salt added onto the surface of MA1010 manufactured by Nippon Shokubai Co., Ltd. in an amount of 2 wt % and 20 g of KNI106GSM manufactured by JFE Chemical Corporation are mixed. The above mixed sample is stirred for 5 minutes using a turbula shaker in an 80% humidity chamber where it is difficult to store a charge and the charge is measured to obtain a result CA1; the mixed sample is stirred for 5 minutes using a turbula shaker in a 5% humidity chamber where it is easily to accumulate the charge and the charge is measured to obtain data CB1; and the mixed sample is stirred for 60 minutes using the turbula shaker in the 5% humidity chamber and the charge is measured to obtain data CB2. Evaluation is performed using the ratios thereof, CB1/CA1 and CB2/CB1.

G1: CB1/CA1 is 1.0 or more and less than 1.15, and the increase in electrostatic capacitance is strongly prevented.

G2: CB1/CA1 is 1.15 or more and less than 1.3, and the increase in electrostatic capacitance is prevented.

G3: CB1/CA1 is 1.3 or more and less than 1.4, and the electrostatic capacitance is slightly increased.

G4: CB1/CA1 is 1.4 or more, and the electrostatic capacitance is increasing.

G1: CB2/CB1 is 0.9 or more and less than 1.1, and the increase in electrostatic capacitance is strongly prevented.

G2: CB2/CB1 is 1.1 or more and less than 1.2, and the increase in electrostatic capacitance is prevented.

G3: CB2/CB1 is 1.2 or more and less than 1.3, and the electrostatic capacitance is slightly increased.

G4: CB2/CB1 is 1.3 or more, and the electrostatic capacitance is increasing.

The abbreviations in each table refer to the following compounds.

ALCH: aluminum ethyl acetoacetate diisopropylate
TMBAC: benzyltributylammonium chloride
TP-415: N,N-Dimethyl-N-tetradecyl-1-tetradecanaminium, hexa-μ-oxotetra-μ3-oxodi-μ5-oxotetradecaoxooctamolybdate(4-) (4:1)
P-51: benzyltrimethylammonium chloride

TABLE 3

|  | $F_{BEFORE}/F_{AFTER}$ | $F_{SINTERING}/F_{BEFORE}$ | $C_{AFTER}/C_{BEFORE}$ | Number average particle diameter nm | Average pore diameter nm | N/(silica particles) × 100 % | $C_{B1}/C_{A1}$ | | $C_{B2}/C_{B1}$ | |
|---|---|---|---|---|---|---|---|---|---|---|
|  | — | — | — |  |  |  | — | Evaluation | — | Evaluation |
| Example 1 | 1.0 | 10.5 | 1.15 | 70 | 0.6 | 0.152 | 1.05 | G1 | 1.04 | G1 |
| Example 2 | 1.05 | 10.2 | 1.1 | 70 | 0.61 | 0.280 | 1.11 | G1 | 0.98 | G1 |
| Example 3 | 0.99 | 10.5 | 1.05 | 70 | 0.58 | 0.031 | 1.18 | G1 | 1.05 | G1 |
| Example 4 | 0.92 | 11.2 | 1.08 | 70 | 0.57 | 0.090 | 1.2 | G2 | 1.03 | G2 |
| Example 5 | 1.01 | 17.8 | 1.16 | 120 | 1.5 | 0.300 | 1.22 | G2 | 1.16 | G2 |
| Example 5-2 | 1.02 | 19.2 | 1.23 | 300 | 1.9 | 0.310 | 1.28 | G2 | 1.18 | G2 |
| Example 6 | 1.03 | 16.2 | 1.31 | 70 | 0.51 | 0.291 | 1.09 | G1 | 1.09 | G1 |
| Example 7 | 0.98 | 17.5 | 1.41 | 70 | 0.58 | 1.050 | 1.24 | G2 | 1.18 | G2 |
| Example 7-2 | 1 | 6.2 | 1.02 | 70 | 0.61 | 0.009 | 1.24 | G2 | 1.02 | G1 |
| Example 8 | 1.03 | 8.1 | 1.01 | 70 | 0.66 | 0.248 | 1.28 | G2 | 1.15 | G2 |
| Comparative Example 1 | 1.06 | 1.02 | 1.05 | 70 | 0.62 | 0.000 | 1.81 | G4 | 1.09 | G1 |
| Comparative Example 2 | 1.25 | 2.15 | 1.98 | 85 | 0.71 | 0.450 | 1.38 | G3 | 1.41 | G4 |

TABLE 4

| | $F_{BEFORE}/F_{AFTER}$ | $F_{SINTERING}/F_{BEFORE}$ | $C_{AFTER}/C_{BEFORE}$ | Number average particle diameter | Average pore diameter | Si/Al | N/(silica particles) × 100 | $C_{B1}/C_{A1}$ | | $C_{B2}/C_{B1}$ | |
|---|---|---|---|---|---|---|---|---|---|---|---|
| | — | — | — | nm | nm | — | % | — | Evaluation | — | Evaluation |
| Example 9 | 1.0 | 10.5 | 1.15 | 70 | 0.6 | 0.05 | 0.152 | 1.05 | G1 | 1.04 | G1 |
| Example 10 | 1.05 | 10.2 | 1.1 | 70 | 0.61 | 0.07 | 0.280 | 1.10 | G1 | 0.99 | G1 |
| Example 11 | 0.99 | 10.5 | 1.05 | 70 | 0.58 | 0.09 | 0.031 | 1.14 | G1 | 1.07 | G1 |
| Example 12 | 0.95 | 11.2 | 1.08 | 70 | 0.57 | 0.025 | 0.090 | 1.2 | G2 | 1.02 | G2 |
| Example 13 | 1.02 | 17.8 | 1.16 | 125 | 1.5 | 0.03 | 0.300 | 1.28 | G2 | 1.12 | G2 |
| Example 13-2 | 1.03 | 19.2 | 1.23 | 310 | 1.9 | 0.15 | 0.310 | 1.23 | G2 | 1.19 | G2 |
| Example 14 | 1.01 | 16.2 | 1.31 | 70 | 0.51 | 0.2 | 0.291 | 1.08 | G1 | 1.09 | G1 |
| Example 15 | 1.08 | 15 | 1.25 | 70 | 0.9 | 0.007 | 0.004 | 1.18 | G2 | 1.19 | G2 |
| Example 16 | 0.98 | 17.5 | 1.41 | 70 | 0.58 | 0.1 | 1.050 | 1.25 | G2 | 1.14 | G2 |
| Example 16-2 | 1 | 6.2 | 1.02 | 70 | 0.61 | 0.23 | 0.009 | 1.24 | G2 | 1.02 | G1 |
| Example 17 | 1.03 | 8.1 | 1.01 | 70 | 0.66 | 0.08 | 0.248 | 1.27 | G2 | 1.15 | G2 |
| Comparative Example 3 | 1.06 | 1.02 | 1.05 | 70 | 0.62 | 0.06 | 0.000 | 1.12 | G1 | 1.85 | G4 |
| Comparative Example 4 | 1.25 | 2.15 | 1.98 | 85 | 0.71 | — | 0.450 | 1.39 | G3 | 1.51 | G4 |

As shown in Tables 1 to 4, it is found that the increase in electrostatic capacitance is prevented in the silica particles of Examples as compared with the silica particles in Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Silica particles, comprising:
   the silica particles containing a quaternary ammonium salt,
   wherein the following expressions are satisfied, $0.90 \leq F_{BEFORE}/F_{AFTER} \leq 1.10$, and $5 \leq F_{SINTERING}/F_{BEFORE} \leq 20$, wherein
   $F_{BEFORE}$ represents a maximum frequency value of a pore diameter of 2 nm or less in the silica particles before washing, which is obtained from a pore distribution curve in a nitrogen gas adsorption method;
   $F_{AFTER}$ represents a maximum frequency value of a pore diameter of 2 nm or less in the silica particles after washing, which is obtained from a pore distribution curve in the nitrogen gas adsorption method; and
   $F_{SINTERING}$ represents a maximum frequency value of a pore diameter of 2 nm or less in the silica particles before washing and after sintering at 600° C., which is obtained from a pore distribution curve in the nitrogen gas adsorption method.

2. The silica particles according to claim 1,
   wherein the quaternary ammonium salt contains a compound represented by a general formula (AM),

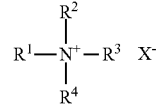

wherein, in the general formula (AM),
   $R^1$, $R^2$, $R^3$ and $R^4$ each independently represents an optionally substituted alkyl group, aralkyl group or aryl group,
   $X^-$ represents an anion, and
   two or more of $R^1$, $R^2$, $R^3$ and $R^4$ may be linked to each other to form a ring.

3. The silica particles according to claim 2,
   wherein, in the general formula (AM), $R^1$, $R^2$, $R^3$ and $R^4$ each independently represents an optionally substituted alkyl group having 1 or more and 16 or less carbon atoms, or an optionally substituted aralkyl group having 7 or more and 10 or less carbon atoms.

4. The silica particles according to claim 1,
   wherein a number average particle diameter of the silica particles is 5 nm or more and 300 nm or less.

5. The silica particles according to claim 1,
   wherein a number average particle diameter of the silica particles is 5 nm or more and 100 nm or less.

6. The silica particles according to claim 1,
   wherein the silica particles satisfy the following expression:

$0.01 \leq N/(\text{silica particle}) \times 100 \leq 1.00$, wherein
   N represents an abundance of a nitrogen element derived from the quaternary ammonium salt detected by an oxygen and nitrogen analysis, and
   (silica particle) represents a total weight of the silica particles.

7. The silica particles according to claim 1,
   wherein an average pore diameter of the silica particle is 0.55 nm or more and 2.00 nm or less.

8. The silica particles according to claim 1,
   wherein the silica particles are is hydrophobically treated silica.

9. The silica particles according to claim 1,
wherein the silica particles contain aluminum.

10. The silica particles according to claim 9,
wherein a ratio Si/Al of an abundance Si of a silicon element detected by an X-ray photoelectron spectroscopy to an abundance Al of an aluminum element detected by the X-ray photoelectron spectroscopy is 0.01 or more and 0.30 or less.

11. A method for producing the silica particles according to claim 1, comprising:
preparing a silica particles-containing suspension; and then
mixing the silica particles-containing suspension with the quaternary ammonium salt to obtain a powder in which the silica particles are surface-treated with the quaternary ammonium salt using a supercritical fluid.

12. The method for producing the silica particles according to claim 11, further comprising:
surface-treating the powder with an organosilicon compound in the supercritical fluid after the mixing.

* * * * *